Feb. 11, 1941.  O. W. DECHAU  2,231,256
LENS MOUNTING
Filed March 6, 1939

INVENTOR
OTTO W. DECHAU
BY
ATTORNEY

Patented Feb. 11, 1941

2,231,256

UNITED STATES PATENT OFFICE 2,231,256

LENS MOUNTING

Otto W. Dechau, Rochester, N. Y., assignor to Art-Craft Optical Co. Inc., a corporation of New York Application March 6, 1939, Serial No. 259,935

1 Claim. (Cl. 88—47)

This invention relates to improvements in eyeglass and spectacle mountings and has for its object to provide such mountings with shock absorbing pads as cushions in combination with spring means which cooperate to provide a novel full floating suspension for the lenses and thus prevent the setting up of any strain in the lens portion which surrounds the screw with which the lens is anchored to the mounting.

This and other objects and attendant advantages of this invention will become more readily apparent from the detailed description thereof which follows, reference being had to the accompanying drawing in which Figure 1 is a front elevation of a pair of lenses supported on the nose piece in accordance with my invention.

Figure 1:
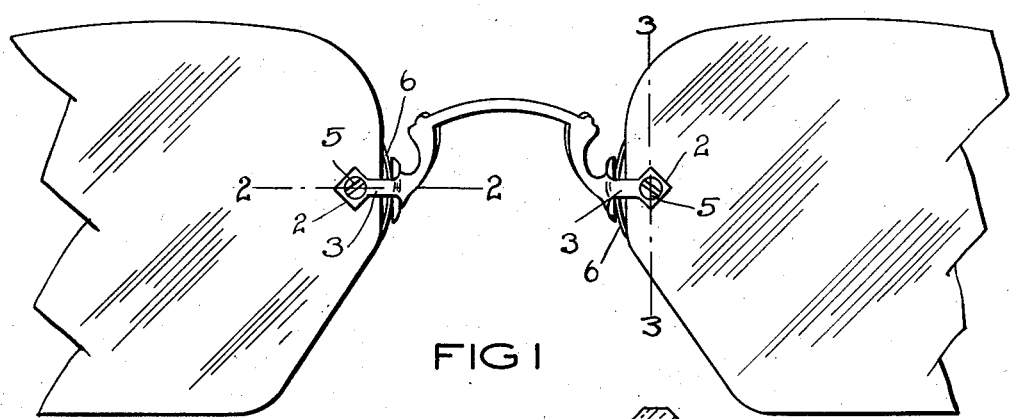
Figure 2:
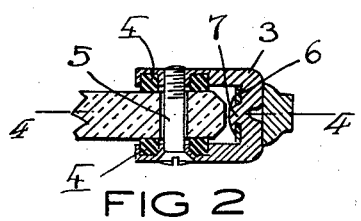
Figure 2 is an enlarged horizontal section taken on the line 2—2 in Figure 1.
Figure 3:
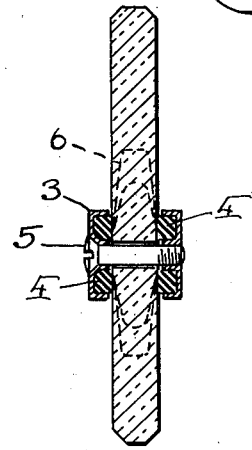
Figure 3 is an enlarged vertical section taken on the line 3—3 in Figure 1.
Figure 4:
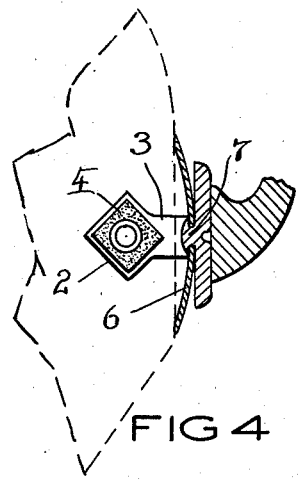
Figure 4 is a longitudinal section taken on the line 4—4 in Figure 2.
Figure 5:
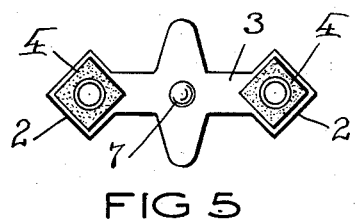
Figure 5 is a rear elevation of one of the lens straps of the lens mount ready to have the spring attached thereto before being bent into shape to have the lens mounted therebetween.

The mounting forming the subject matter of my present invention is adapted to hold the lens so that any strain on the lens will be absorbed by the mounting and cannot cause a breaking of the lens. The various methods heretofore used have only partially secured this result. In the present invention the shock absorbing cushioning members are embodied both in the sides and the end of the lens strap and automatically adjust themselves so that the lens is universally cushioned against shock or strain from any direction.

To accomplish this the enlarged ears 2, 2 on each end of the strap 3 are recessed on the inside to receive the resilient cushions 4, 4 and have them suitably fastened in place therein. The ears, together with the cushions, are perforated to receive the lens screw 5 and have this screw pass thru one of the ears and the perforation in the lens into threaded engagement with the other ear. In tightening the screw the ears are thus drawn toward each other and the cushions 4 forced against each side of the lens around the lens screw. The tension exerted by the lens screw against the ears is thus transmitted thru the resilient cushions which distribute the tension over the contacting area of the cushion with the lens and, due to their resiliency, prevent undue strain on the lens.

To complete the floating or universally cushioning function of the mounting of the lens, the cushioning of the sides of the lens between the ears of the strap is supplemented by the cushioning of the edge of the lens intermediate the strap. This is provided by the leaf spring 6 which is centrally attached to the strap so as to extend above and below it in order to have the ends thereof yieldingly engage the edge of the lens and thus cushion any endwise or rocking movement of the lens between the straps. For the attachment of the spring a lug 7 is formed intermediate the strap on the inside thereof and this lug is adapted to project thru a suitable perforation in the middle of the spring 6 so that its head may be riveted over the spring to clamp the middle of the spring to the strap while the outer ends thereof are free to exert a yielding pressure against the edge of the lens above and below the cushions 4, 4. This provides a yielding three point suspension for the lens on the strap which will absorb any shock or strain to which the attached portion of the lens is subjected during the mounting of the lens and the use of the eyeglasses thereafter.

A slight rocking motion of the lens on the screw in a plane at right angles to the axis of the screw is thus yieldingly resisted by the action of the spring so that the lens will return to its normal position after it has been temporarily displaced. A twisting motion of the lens in a plane substantially parallel to the axis of the screw, on the other hand, is yieldingly resisted by the cushions themselves which will return the lens to their normal position after being displaced.

I claim:

A mounting for a lens, comprising a lens strap, enlarged ears on the outer end of said strap with holes extending centrally therethru, a recess spacedly encircling each of said holes on the inside of the enlarged ears of said strap, a resilient cushion in each of said recesses so as to spacedly encircle the hole in each of said ears of said strap and project inwardly thereof, bolt means extending thru the holes in the ears of said strap adapted to draw the projecting surfaces of the resilient cushions against the portion of the lens engaging between said ears, and spring means intermediate said strap on the inside thereof for yieldingly engaging the edge of the lens portion engaging into the strap.

OTTO W. DECHAU.